US011462732B2

(12) United States Patent
Kalo et al.

(10) Patent No.: US 11,462,732 B2
(45) Date of Patent: Oct. 4, 2022

(54) PROCESS FOR MAKING A COATED ELECTRODE ACTIVE MATERIAL

(71) Applicant: BASF SE, Ludwigshafen am Rhein (DE)

(72) Inventors: Benedikt Kalo, Ludwigshafen (DE); Torsten Maeurer, Ludwigshafen (DE); Regina Vogelsang, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 16/976,252

(22) PCT Filed: Feb. 18, 2019

(86) PCT No.: PCT/EP2019/053926
§ 371 (c)(1),
(2) Date: Aug. 27, 2020

(87) PCT Pub. No.: WO2019/166253
PCT Pub. Date: Sep. 6, 2019

(65) Prior Publication Data
US 2021/0020926 A1    Jan. 21, 2021

(30) Foreign Application Priority Data

Feb. 28, 2018    (EP) .................................... 18159047

(51) Int. Cl.
| H01M 4/36 | (2006.01) |
| H01M 4/505 | (2010.01) |
| H01M 4/525 | (2010.01) |
| H01M 4/62 | (2006.01) |
| H01M 10/0525 | (2010.01) |
| H01M 4/02 | (2006.01) |

(52) U.S. Cl.
CPC ........... *H01M 4/366* (2013.01); *H01M 4/505* (2013.01); *H01M 4/525* (2013.01); *H01M 4/62* (2013.01); *H01M 10/0525* (2013.01); *H01M 2004/028* (2013.01)

(58) Field of Classification Search
CPC .................................................. H01M 4/366
See application file for complete search history.

(56) References Cited

U.S. PATENT DOCUMENTS

| 8,993,051 | B2 | 3/2015 | Kelder et al. | |
| 2002/0141937 | A1 | 10/2002 | Howard, Jr. et al. | |
| 2009/0081546 | A1* | 3/2009 | Ogasawara | H01M 4/5825 427/126.4 |
| 2011/0076556 | A1* | 3/2011 | Karthikeyan | H01M 4/485 429/188 |
| 2012/0319035 | A1 | 12/2012 | Lampert et al. | |
| 2013/0263525 | A1* | 10/2013 | Erickson | B24D 3/008 51/309 |
| 2014/0087266 | A1 | 3/2014 | Li et al. | |
| 2014/0120378 | A1 | 5/2014 | Mun et al. | |
| 2015/0183644 | A1* | 7/2015 | Siu | C01B 32/39 423/445 R |
| 2016/0141599 | A1* | 5/2016 | Takahashi | H01M 4/366 429/231.8 |
| 2017/0179484 | A1* | 6/2017 | Park | H01M 4/505 |
| 2017/0253494 | A1* | 9/2017 | Garella | B01J 19/02 |
| 2017/0256792 | A1 | 9/2017 | Kondo et al. | |
| 2019/0044135 | A1* | 2/2019 | Du | H01M 4/5825 |
| 2019/0260018 | A1* | 8/2019 | Matsuyama | H01M 4/505 |

FOREIGN PATENT DOCUMENTS

| CN | 104201323 A | 12/2014 |
| WO | WO 2019/154701 A1 | 8/2019 |
| WO | WO 2019/154702 A1 | 8/2019 |

OTHER PUBLICATIONS

Liu et al. "Slumping-rolling transition of granular solids in rotary kilns" (Year: 2005).*
International Search Report dated Apr. 18, 2019 in PCT/EP2019/053926, 4 pages.
Extended European Search Report dated Jun. 25, 2018 in European Patent Application No. 18159047.2, 4 pages.
Crowell, J.E., "Chemical methods of thin film deposition: Chemical vapor deposition, atomic layer deposition, and related technologies", Journal of Vacuum Science & Technology A, vol. 21, Issue 5, Sep. 3, 2003, p. S88-S95 with cover pages.
Liu, X. Y., et al., "Slumping—rolling transition of granular solids in rotary kilns", Chemical Engineering Science, vol. 60, Issue 13, Jul. 2005, XP027646311, pp. 3629-3636.

* cited by examiner

*Primary Examiner* — Austin Murata
(74) *Attorney, Agent, or Firm* — Finnegan, Henderson, Farabow, Garrett & Dunner, LLP

(57) ABSTRACT

Process for making a coated electrode active material wherein said process comprises the following steps: (a) providing a particulate electrode active material according to general formula $Li_{1+x}TM_{1-x}O_2$, wherein TM is a combination of Ni, Co and, optionally, Mn, and, optionally, at least one metal selected from Mg, Al, Ba, Ti and Zr, and x is in the range of from zero to 0.2, wherein at least 15 mole-% of the transition metal of TM is Ni, (b) treating said electrode active material with a compound of $M^1$, wherein $M^1$ is selected from Li, Al, B, Mg, Si, Sn, and from transition metals, or a combination of at least two of the foregoing, with or without a solvent, wherein said compound of M1 does not act as a cathode active material on its own, (c) optionally, removing compound of $M^1$ which is not deposited on said particulate electrode active material, (d) performing a post-treatment by heating the material obtained after the step (b) or (c), if applicable, at a temperature from 300 to 800° C. in a rotary kiln or pendulum kiln.

11 Claims, No Drawings

PROCESS FOR MAKING A COATED ELECTRODE ACTIVE MATERIAL

The present invention is directed towards a process for making a coated electrode active material wherein said process comprises the following steps:

(a) providing a particulate electrode active material according to general formula $Li_{1+x}TM_{1-x}O_2$, wherein TM is a combination of Ni, Co and, optionally, Mn, and, optionally, at least one metal selected from Mg, Ba, Al, Ti and Zr, and x is in the range of from zero to 0.2, wherein at least 15 mole-% of the transition metal of TM is Ni, (b) treating said electrode active material with a compound of $M^1$, wherein $M^1$ is selected from Li, Al, B, Mg, Si, Sn, and from transition metals, or a combination of at least two of the foregoing, with or without a solvent, wherein said compound of $M^1$ does not act as a cathode active material on its own, (c) optionally, removing compound of $M^1$ which is not deposited on said particulate electrode active material, (d) performing a post-treatment by heating the material obtained after the step (b) or (c), if applicable, at a temperature from 300 to 800° C. in a rotary kiln or pendulum kiln.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

One problem of lithium ion batteries lies in undesired reactions on the surface of the cathode active materials. Such reactions may be a decomposition of the electrolyte or the solvent or both. It has thus been tried to protect the surface without hindering the lithium exchange during charging and discharging. Examples are attempts to coat the cathode active materials with, e.g., aluminium oxide or calcium oxide, see, e.g., U.S. Pat. No. 8,993,051.

The efficiency of the process to protect the manufacture of such protected cathode active material, however, may still be improved.

It was therefore an objective of the present invention to provide a process by which particulate electrode active material may be manufactured that have a sufficient stability against undesired reactions on the surface. Such process improvement should be easy to perform and lead to a uniform product.

Accordingly, the process as defined at the outset has been found, hereinafter also referred to as inventive process or as process according to the (present) invention. The inventive process is a process for making a coated electrode active material.

In one embodiment of the present invention the particulate material electrode active material has an average particle diameter (D50) in the range of from 2 to 20 μm, preferably from 5 to 16 μm. The average particle diameter can be determined, e.g., by light scattering or LASER diffraction or electroacoustic spectroscopy. The particles are usually composed of agglomerates from primary particles, and the above particle diameter refers to the secondary particle diameter.

The term "coated" as used in the context with the present invention refers to at least 80% of the particles of a batch of particulate material being coated, and to at least 75% of the surface of each particle being coated, for example 75 to 99.99% and preferably 80 to 95%.

The thickness of such coating may be very low, for example 0.1 nm to 2 μm. In some embodiments, the thickness may be in the range of from 6 to 150 nm. In further embodiments, the thickness of such coating is in the range of from 16 to 50 nm. The thickness in this context refers to an average thickness determined mathematically by calculating the amount of compound of $M^1$ per particle surface in $m^2$ and assuming a 100% conversion.

Preferably, the average thickness of a coating amounts to a maximum of 10% of the average diameter (D50) of such particulate material electrode active material.

The inventive process comprises steps (a), (b), (c) and (d), in the context of the present invention also referred to as step (a), step (b), step (c) and step (d), respectively.

Step (a) includes providing a particulate electrode active material according to general formula $Li_{1+x}TM_{1-x}O_2$, wherein TM is a combination of Ni, Co and, optionally, Mn, and, optionally, at least one metal selected from Mg, Al, Ba, Ti and Zr, and x is in the range of from zero to 0.2, wherein at least 15 mole-%, preferably at least 33 mole-% of the transition metal of TM is Ni, even more preferably at least 50 mole-%. Said electrode active material is selected from lithiated nickel-cobalt aluminum oxides, and lithiated cobalt-manganese oxide.

In one embodiment of the present invention, the particulate electrode active material has a specific surface ("BET surface") in the range of from 0.1 to 10 $m^2/g$, preferably from 0.1 to 1.5 $m^2/g$. The BET surface may be determined by nitrogen adsorption after outgassing of the sample at 200° C. for 30 minutes or more and beyond this accordance with DIN ISO 9277:2010.

Examples of layered nickel-cobalt-manganese oxides are compounds according to general formula (I)

$$(Ni_aCo_bMn_c)_{1-d}M_d \quad (I)$$

with
a being in the range of from 0.6 to 0.95,
b being in the range of from 0.025 to 0.2,
c being in the range of from 0.025 to 0.2, and
d being in the range of from zero to 0.2,
M is Mg, Al, Ba, W, Ti or Zr or a combination of at least two of the foregoing, and $$a+b+c=1.$$

Examples of preferred lithiated nickel-cobalt aluminum oxides are compounds of the general formula $Li[Ni_hCo_iAl_j]O_{2+r}$. Typical values for r, h, i and j are:
h is in the range of from 0.75 to 0.95,
i is in the range of from 0.04 to 0.20,
j is in the range of from 0.01 to 0.05, and
r is in the range of from zero to 0.4.

Particularly preferred are $Li_{(1+x)}[Ni_{0.2}Co_{0.1}Mn_{0.7}]_{(1-x)}O_2$, $Li_{(1+x)}[Ni_{0.33}Co_{0.33}Mn_{0.33}]_{(1-x)}O_2$, $Li_{(1+s)}[Ni_{0.5}Co_{0.2}Mn_{0.3}]_{(1-x)}O_2$, $Li_{(1+x)}[Ni_{0.6}Co_{0.2}Mn_{0.2}]_{(1-x)}O_2$, $Li_{(1+x)}[Ni_{0.7}Co_{0.2}Mn_{0.1}]_{(1-x)}O$, and $Li_{(1+x)}[Ni_{0.8}Co_{0.1}Mn_{0.1}]_{(1-x)}O_2$, each with x as defined above, and $Li[Ni_{0.9}Co_{0.05}Al_{0.05}]O_2$.

Said particulate electrode active material is preferably provided without any additive such as conductive carbon or binder.

In step (a), particulate electrode active material may be provided as free-flowing powder or as slurry in an organic solvent or in water. Free-flowing powders are preferred.

Step (b) includes treating said electrode active material with a compound of $M^1$, wherein $M^1$ is selected from Al, B, Mg, and from transition metals, or a combination of at least two of the foregoing, with or without a solvent. Such treatment may be performed in one step or in one or more sub-steps, for example by coating, deposition or impregnation, especially mechanical solid coating, or by chemical vapor deposition or by impregnation methods.

Steps (b) and (c) of the inventive process are performed in a mixer or a vessel or a cascade of at least two vessels, said mixer or vessel or cascade—if applicable—also being referred to as reactor in the context of the present invention.

In one embodiment of the inventive process, step (b) is performed at a temperature in the range of from 15 to 1000° C., preferably 15 to 500° C., more preferably 20 to 350° C., and even more preferably 20 to 50° C. It is preferred to select a temperature in step (b) at which compound of $M^1$, as the case may be, is in the gas phase.

In one embodiment of the present invention, step (b) is carried out at normal pressure but step (b) may as well be carried out at reduced or elevated pressure. For example, step (b) may be carried out at a pressure in the range of from 5 mbar to 1 bar above normal pressure, preferably 10 to 150 mbar above normal pressure. In the context of the present invention, normal pressure is 1 atm or 1013 mbar. In other embodiments, step (b) may be carried out at a pressure in the range of from 150 mbar to 560 mbar above normal pressure. In other embodiments, step (b) is performed at reduced pressure, for example from 1 to 550 mbar.

In a preferred embodiment of the present invention, compounds of $M^1$ are selected from compounds of Al, Ti, B, Mg, Co, Y, Ta or Zr and combinations of at least two of the foregoing. Said compound of $M^1$ does not act as a cathode active material on its own.

In a preferred embodiment of the present invention, compounds of $M^1$ are selected from $LiOR^2$, LiOH, LiX, $M^2(R^1)_2$, $M^3(R^1)_3$, $M^4(R^1)_{4-y}H_y$, $M^2(OR^2)_2$, $M^2(OH)_2$, $M^3(OR^2)_3$, $M^3(OH)_3$, $M^3OOH$, $M^4(OR^2)_4$, $M^4[NR^2]_2]_4$, $M^2X_2$, $M^3X_3$, $M^4X_4$ and $M^5X_5$, and compounds of $M^1$ with combinations of counterions, for example $M^2(R^1)X$, $M^3(R^1)_2X$, $M^3R^1X_2$, $M^4(R^1)_3X$, $M^4(R^1)_2X_2$, $M^4R^1X_3$, and from methyl alumoxane, wherein the variables are defined as follows:

$R^1$ are different or equal and selected from $C_1$-$C_8$-alkyl, straight-chain or branched, $R^2$ are different or equal and selected from $C_1$-$C_4$-alkyl, straight-chain or branched, X are same or different and selected from acetate, formate, nitrate or halide, especially nitrate or chloride, wherein two ions of X may be replaced by sulfate or oxide, $M^2$ is selected from Mg and Zn and Co, $M^3$ is selected from Al, B, Y and Ti, $M^4$ is selected from Si, Sn, Ti, Zr, and Hf, with Sn and Ti being preferred, $M^5$ is selected from Nb and Ta, the variable y is selected from zero to 4, especially from zero and 1.

Examples of LiX are LiNO3, LiOH and LiCl.

Examples of $M^2(R^1)_2$ are n-$C_4H_9$-Mg(n-octyl), $Zn(CH_3)_2$ and $Zn(C_2H_5)_2$. Examples of $M^2(OR^1)_2$ are $Zn(OCH_3)_2$, $Zn(OC_2H_5)_2$, $Mg(OCH_3)_2$, and $Mg(OC_2H_5)_2$.

Examples of $M^2X_2$, are $ZnCl_2$, $ZnSO_4$, ZnO, $Zn(NO_3)_2$, $MgCl_2$, $MgSO_4$, MgO, $Mg(NO_3)_2$, $CoCl_2$, CoO, $CoSO_4$, and $Co(NO_3)_2$.

Preferred examples of $M^3(OR^2)_3$ and $M^4(OR^2)_4$ are $Si(OCH_3)_4$, $Si(OC_2H_5)_4$, $Si(O$-n-$C_3H_7)_4$, $Si(O$-iso-$C_3H_7)_4$, $Si(O$-n-$C_4H_9)_4$, $Ti[OCH(CH_3)_2]_4$, $Ti(OC_4H_9)_4$, $Zn(OC_3H_7)_2$, $Zr(OC_4H_9)_4$, $Zr(OC_2H_5)_4$, $B(OCH_3)_3$, $B(OC_2H_5)_3$, $Al(OCH_3)_3$, $Al(OC_2H_5)_3$, $Al(O$-n-$C_3H_7)_3$, $Al(O$-iso-$C_3H_7)_3$, $Al(O$-sec.-$C_4H_9)_3$, and $Al(OC_2H_5)(O$-sec.-$C_4H_9)_2$.

Examples of aluminum alkyl compounds are trimethyl aluminum, triethyl aluminum, triisobutyl aluminum, and methyl alumoxane.

Metal amides are sometimes also referred to as metal imides. Examples of metal amides are $Ti[N(CH_3)_2]_4$ and $Zr[N(CH_3)_2]_4$.

Examples of $M^3X_3$, $M^4X_4$ and $M^5X_5$ and of compounds of $M^1$ with combinations of counterions are $Al(NO_3)_3$, $AlONO_3$, $Al_2(SO_4)_3$, AlOOH, $Al_2O_3$, $Al(OH)_3$, $B_2O_3$, $B(OH)_3$, $TiCl_4$, $TiOCl_2$, $TiO(NO_3)_2$, $Ti(SO_4)_2$, $TiO_2$, TiO(OH)$_2$, $TiOSO_4$, $ZrCl_4$, $ZrOCl_2$, $ZrO_2$, $ZrO(OH)_2$, $Zr(SO_4)_2$, $ZrOSO_4$, $ZrO(NO_3)_2$, $HfO_2$, $HfO(OH)_2$, $HfCl_4$, $HfOCl_2$, $Hf(SO_4)_2$, $HfO_5O_4$, $HfO(NO_3)_2$, $SiCl_4$, $(CH_3)_3SiCl$, $SiO_2$, $CH_3SiCl_3$, $SnCl_4$, SnO and $SnO_2$.

Examples of methylalumoxane are partially hydrolyzed trimethylaluminum types including compounds of the general stoichiometry $Al(CH_3)_2OH$ and $Al(CH_3)(OH)_2$.

In one embodiment of the present invention, step (b) is carried out in a solvent, for example an organic solvent or preferably water. Examples of organic solvents are methanol, ethanol, n-heptane, n-decane, decahydronaphthalene, cyclohexane, toluene, ethylbenzene, ortho-, meta- and para-xylene, dimethyl carbonate, diethyl carbonate, methyl ethyl carbonate, ethylene carbonate, propylene carbonate, diethyl ether, diisopropyl ether, di-n-butyl ether, methyl tert-butyl ether, 1,2-dimethoxyethane, 1,1-dimethoxyethane, 1,2-diethoxyethane, 1,1-diethoxyethane, tetrahydrofuran (THF), 1,4-dioxane, 1,3-dioxolane, N,N-dimethylformamide, N,N-dimethylacetamide and N-methylpyrrolidone (NMP), N-ethylpyrrolidone (NEP), acetone, methyl ethyl ketone, dimethyl sulfoxide (DMSO) and cyclohexanone.

In a preferred embodiment, step (b) is performed by slurrying said particulate electrode active material in an aqueous medium and contacting it with a compound of $M^1$ in said aqueous medium.

In embodiments wherein a solvent is applied it is preferred if the volume ratio of solvent to particulate electrode active material is in the range of from 9:1 to 1:50. In embodiments wherein water is applied as solvent it is preferred if the volume ratio of solvent to particulate electrode active material is in the range of from 5:1 to 1:50.

In one embodiment, it is preferred to apply 0.1 to 20% by weight of compound of $M^1$, referring to particulate electrode active material, more preferred are 10 to 20% by weight.

In order to achieve such a solvent- or water-based step (b), particulate electrode active material is slurried in an organic solvent or in water. Such slurrying may be effected at a temperature in the range of from 10 to 100° C., preferably 20 to 60° C.

A solution of compound of $M^1$ that is soluble in said organic solvent or water, respectively, in said organic solvent or preferably in water is then provided. Said solution is then contacted with the particulate electrode active material from step (a). Such contacting may be accomplished by adding particulate electrode active material to the solution of compound of $M^1$, or by adding solution of compound of $M^1$ to particulate electrode active material.

By such contact, compound of $M^1$ is allowed to interact with the particulate electrode active material. For example, compound of $M^1$ migrates into the pores of particulate electrode active material and is deposited on the surface as such or—preferably—with a release of counterion. it is advantages if counterions such as halide are removed as completely as possible.

Step (b) may have a duration in the range of from one minute to 10 hours, preferably two minutes to two hours, more preferably 5 minutes to one hour. It is preferred to slurry particulate electrode active material until a lump-free slurry has been obtained.

In one embodiment of the present invention, step (b) is carried out in the form of a chemical vapor decomposition reaction. This includes that particulate electrode active material is treated with evaporated compound of $M^1$ or with an aerogel of compound of $M^1$.

In yet another embodiment of the present invention, step (b) is carried out with little or without a solvent, and a particulate compound of $M^1$, for example an oxide, hydroxide or oxyhydroxide is mixed with compound according the general formula $Li_{1+x}TM_{1-x}O_2$, for example in a ploughshare mixer, in a tumble mixer, in a horizontal mixer, in a high speed mixer, in a high-shear mixer, in a conical mixer, in an Eirich mixer or in a free-fall mixer.

Dry mixing may be performed without a solvent or with very small amounts, for example a particulate compound of $M^1$ being diluted with 10 to 100 vol-% of solvent. The desired amount of compound of $M^1$, non-diluted or diluted, is then added to the respective particulate electrode active material, and both are mixed.

Mixing may be performed in a stirred vessel, in ploughshare mixers, paddle mixers and shovel mixers. Preferably, the inventive process is carried out in a shovel mixing tool, in a paddle mixing tool, in a Becker blade mixing tool and, most preferably, in a high-shear or in a high-speed mixer or in a ploughshare mixer. Preferred ploughshare mixers are installed horizontally, the term horizontal referring to the axis around which the mixing element rotates.

In a preferred embodiment, step (b) is carried out in a drum or pipe-shaped vessel that rotates around its horizontal axis. In a more preferred embodiment, step (b) is carried out in a rotating vessel that has baffles.

An optional step (c) includes removing compound of $M^1$ which is not deposited on said particulate electrode active material. Such optional step (c) may be performed filtering off the treated particulate electrode active material in embodiments that are solvent-based or water-based. together with the solvent—or water, if applicable, unreacted compound of $M^1$ is removed.

An additional optional step may include removal of the solvent, if any. Removal of said solvent may be accomplished by, for example, filtration, extractive washing, removal of solvent by distilling off said solvent, drying and evaporation. In a preferred embodiment, all or almost all solvent, for example 99% by weight or more, is removed by evaporation.

In embodiments of evaporative removal of solvent ("evaporation"), such an optional removal step may be performed at a temperature in the range of from zero to 300° C. In embodiments of filtration or extractive washing, such optional removal step may be performed at a temperature in the range of from zero to 100° C., preferably 15 to 90° C.

In embodiments wherein such optional removal step is performed as removal by distillation or evaporation of solvent, a pressure in the range of from 1 to 500 mbar may be applied. In embodiments of filtration or extractive washing, such optional removal step may be performed at ambient pressure as well.

Such removal—if applicable—is best performed between steps (c) and (d).

Step (d) includes performing a post-treatment by heating the material obtained after the step (b) or (c), if applicable, at a temperature from 300 to 800° C., preferably from 405 to 800° C. and more preferably from 450 to 750° C., in a rotary kiln or pendulum kiln.

Pendulum kilns are known per se, see, e.g., U.S. 2012/0319035. In embodiments wherein step (d) is performed in a pendulum kiln said pendulum kiln performs incomplete rotary motions about one axis, preferably the longitudinal axis. Such incomplete motions amount to a rotation of less than 360° but not to rotations by 360°. In one embodiment, the field of traverse of such incomplete rotary motion is in the range of from 40 to 300°, preferably 60 to 250°, more preferably from 80 to 180° and even more preferably 90 to 130°. The field of traverse of incomplete rotary motions may be determined between the two end deflections (points of reversal) of the rotary motion.

Rotary kilns and pendulum kilns suitable for step (d) may have a length in the range of from 2 to 50 m, preferably 3 to 35 m and even more preferred from 5 to 25 m. Rotary kilns with a length below 1.5 meters are useful for laboratory trials.

The cross section of rotary kilns and of pendulum kilns suitable for step (d) may have an average diameter of from 200 to 10,000 mm, preferably 300 to 5,000 mm and even more preferably from 300 to 4,000 mm. The cross-section may be circular or non-circular, for example prismatic, circular being preferred.

Rotary kilns and pendulum kilns may include internals such as baffles, lifter flights, screws, helixes, overflow weirs or similar modifications of inner tube surface to improve mixing, contact with the gas phase or, increase holdup. Internals may be removable or attached to the tube, e.g. by welding. Internals in this sense also may be any modifications of the inner tube surface making it different than purely cylindrical.

The tube or retort material in contact with at least partially coated particulate electrode active material may be a metal, a metal alloy, a ceramic, a reinforced ceramic or a lining made from either of the foregoing. In one embodiment, alloys are selected from stainless steel and a nickel based alloy. In another embodiment, the ceramic is an oxide ceramic, preferred are oxides of Al, Mg, Si, Zr, Y and mixtures thereof. In one embodiment, the ceramic is non-oxide ceramic, for example a carbide ceramic or nitride ceramic, for example SiC, $Si_3N_4$, or tungsten carbide, WC. In one embodiment, the reinforced ceramic is a ceramic matrix composite, preferred are alumina fiber reinforced alumina and silicon carbide fiber reinforced silicon carbide. In one embodiment, the lining is alumina ceramic tile lining. In one embodiment, the lining is a tungsten carbide coating. In other embodiments, the kiln material is selected from alumized alloys, titanized alloys, pure nickel and platinum coated alloys.

In one embodiment, the rotary kiln or pendulum kiln has knockers. By use of knockers, particulate electrode active material is prevented from sticking at the tube wall and is kept flowable.

In one embodiment of the present invention, step (d) has a duration in the range of from 20 minutes to 180 minutes, preferably 30 to 150 minutes and even more preferably 30 to 100 minutes.

In one embodiment of the present invention step (d) is carried out in an indirect heated rotary kiln. Indirect heated rotary kilns are preferred due to the adjustable gas atmosphere inside the rotary tube, as heat is transferred to the product through the tube wall. In direct heated rotary kilns, heat is provided by hot flue gas inside the rotary tube or a combustion process inside the tube, limiting the freedom of adjustment of atmosphere.

In one embodiment of the present invention in step (d), the rotary kiln is operated with a Froude number in the range of from $10^{-5}$ to $10^{-2}$. The Froude number as used herein is defined as the ratio of centrifugal force and gravitational force.

In one embodiment of the present invention step (d) is carried out in an atmosphere with a concentration of oxygen of at least 20% by vol., for example in air or in mixtures of oxygen and air, for example air:oxygen of 1:1 by volume or an 80% by volume or 99% by volume oxygen.

In one embodiment of the present invention step (d) is carried out in counter current flow, regarding the main flow direction of solid and gas phase in a rotary or pendulum kiln.

After having performed step (d), the coated electrode active material is cooled down to ambient temperature.

In one embodiment of the present invention said cooling is carried out in a cooled rotary tube. The cooled rotary tube is directly attached to the rotary kiln tube used for heat treatment or may be a separate, individual tube. In one embodiment of the present invention the cooling tube is cooled by water. In one embodiment of the present invention the outer surface of the cooling rotary tube is continuously washed over with water.

In one embodiment of the present invention the outer surface of the rotary tube for cooling is continuously air cooled by means of forced convection, by removal of air with a blower, or with a fan machine. The outer surface of said rotary tube for cooling may be cooled by way of a fan machine or blower as well.

In one embodiment of the present invention the outer surface of the cooling rotary tube is continuously air cooled by means of forced convection.

After cooling, the material may optionally be milled in an air classifier mill. Before or after optional milling, the material may optionally be classified using a screen. The material may furthermore me processed in a magnetic separator, freeing the powder from magnetic impurities.

Coated electrode active material obtained according to the inventive process shows excellent electrochemical behavior, for example reduction in impedance growth, gassing, rate capability and cycle life. It shows a very low tendency to agglomeration of secondary particles.

The present invention is further explained by working examples.

General Remarks:

In steps (d), the following rotary kiln was used: rotary kiln with a retort having an inner diameter of 300 mm. The total retort length was 4830 mm while the heated length of the retort was 1800 mm. The heated length is divided in 5 individually controllable heating zones. Removable lifter flight internals were applied. This rotary kiln is referred to "RK 1".

Test recipe: The positive electrodes for the electrochemical cycling experiments in single layer pouch cells were prepared by coating on aluminum foil (thickness=20 μm) using a continuous doctor knife coating system with subsequent drying (Mathis, KTF-S) a slurry containing 94 wt. % cathode active material—either C.CAM.1, CAM.2, CAM.3, or CAM.4, respectively—(94 wt. %), 1 wt. % active carbon (Super C65 L purchased form Imerys), 2 wt. % graphite (SFG6L from Imerys) and 3 wt. % polyvinylidene fluoride (PVdF) binder suspended in N-methyl-2-pyrrolidinone (NMP). Typically, all the slurries were prepared based on at least 30 g of cathode active material and the amount of NMP employed was such that the total solid content (CAM+SuperC65 L+SFG6L+PVdF) was about 65%. Before the cell assembly, the electrode tapes were dried in a hot-air chamber at 120° C. over a period of 16 hours and finally pressed using a roll calendar.

Precursor Manufacture:

A stirred tank reactor was filled with deionized water. The precipitation of mixed transition metal hydroxide precursor was started by simultaneous feed of an aqueous transition metal solution and an alkaline precipitation agent at a flow rate ratio of 1.9, and a total flow rate resulting in a residence time of 8 hours. The aqueous transition metal solution contained Ni, Co and Mn at a molar ratio of 6:2:2 as sulfates each and a total transition metal concentration of 1.65 mol/kg. The alkaline precipitation agent consisted of 25 wt. % sodium hydroxide solution and 25 wt. % ammonia solution in a weight ratio of 25. The pH value was kept at 11.9 by separate feed of an aqueous sodium hydroxide solution. After stabilization of particle size the resulting suspension was removed continuously from the stirred vessel. The mixed transition metal (TM) oxyhydroxide precursor was obtained by filtration of the resulting suspension, washing with distilled water, drying at 120° C. in air and sieving.

Step (a.1):

C-CAM.1 (Comparative): The mixed transition metal oxyhydroxide precursor obtained as above was mixed with LiOH monohydrate to obtain a Li/TM molar ratio of 1.02. The mixture was heated to 885° C. and kept for 8 hours in a forced flow of oxygen to obtain a particulate electrode active material.

D50=9.4 pm determined using the technique of laser diffraction in a Mastersize 3000 instrument from Malvern Instruments. Residual moisture at 250° C. was determined to be 300 ppm.

Step (b.1):

The particulate electrode active material from step (a.1) was contacted with nano crystalline alumina in a high shear mixer to form a coating of alumina nano particles on the cathode active material particles. The amount of alumina was adjusted to 0.1% Al by mol referring to total Ni+Co+Mn. Treated electrode active material C-CAM.1 was obtained.

No step (c) was performed.

Step (d.1)

C-CAM.1 was fed to RK 1 with an input rate of 12 kg/h. The temperature set-point of all heating zones was 670° C. The retort inclination was set to 1°. The retort revolution speed was 1.1 rounds per minute, leading to a residence time in the heated zone of approximately 1.1 hours. Countercurrent air flow was used with a flow rate of 4 m³/h at norm conditions. Inventive electrode active material CAM.2 was obtained.

CAM.2 was analyzed for discharge impedance growth rate, using single layer pouch cells and pulse testing. The impedance growth at $500^{th}$ cycle vs. $1^{st}$ cycle was 159%.

Step (d.2)

C-CAM.1 was fed to RK 1 with an input rate of 15 kg/h. The temperature set-point of all heating zones was 670° C. The retort inclination was set to 1°. The retort revolution speed was 1.1 rounds per minute, leading to a residence time in the heated zone of approximately 1.1 hours. Countercurrent air flow was used with a flow rate of 4 m³/h at norm conditions. Inventive electrode active material CAM.3 was obtained.

CAM.3 was analyzed for discharge impedance growth rate, using single layer pouch cells and pulse testing. The impedance growth at $500^{th}$ cycle vs. $1^{st}$ cycle was 163%.

COMPARATIVE EXAMPLE 1

C-CAM.1 was analyzed for discharge impedance growth rate, using single layer pouch cells and pulse testing. The impedance growth at $500^{th}$ cycle vs. $1^{st}$ cycle was 180%.

The invention claimed is:

1. A process for making a coated electrode active material, the process comprising:
   mixing a particulate electrode active material with a particulate compound of $M^1$, wherein the particulate compound of $M^1$ is nano crystalline alumina, and optionally a solvent,
   wherein:
   the particulate electrode active material has a formula $Li_{1+x}TM_{1-x}O_2$,
   TM is a combination of Ni and Co, and, optionally, at least one metal chosen from Mn, Mg, Al, Ba, Ti, W, and Zr,
   x is in the range of from zero to 0.2, and at least 15 mole-% of TM is Ni, and
   wherein, if a solvent is present during the mixing, the solvent has a concentration in a range of 10 to 100 vol-% relative to a volume of the particulate compound of $M^1$;
   optionally removing a particulate compound of $M^1$ which is not deposited on the particulate electrode active material; and
   heating the material obtained after the mixing or the optionally removing at a temperature from 300 to 800° C. in a rotary kiln or a pendulum kiln to produce the coated electrode active material,
   wherein the coated electrode active material comprises particles of the particulate electrode active material,
   wherein at least 80% of the particles of the particulate electrode active material each have at least 75% of their surface coated with the particulate compound of $M^1$ and, after coating, the particulate compound of $M^1$ does not act as a cathode active material on its own, and
   wherein the coated electrode active material has a coating thickness ranging from 0.1 nm to 2 μm.

2. The process of claim 1, wherein TM is a combination of transition metals according to formula (I):

$$(Ni_aCo_bMn_c)_{1-d}M_d \qquad (I),$$

wherein:
a is in the range of from 0.6 to 0.95,
b is in the range of from 0.025 to 0.2,
c is in the range of from 0.025 to 0.2,
d is in the range of from zero to 0.2,
M is at least one chosen from Mg, Al, Ba, W, Ti, and Zr, and
a+b+c=1.

3. The process of claim 1, wherein a solvent is not present during the mixing, and
wherein the mixing is in at least one mixer chosen from a plough-share mixer, a tumble mixer, a horizontal mixer, a high speed mixer, a high shear mixer, a conical mixer, an Eirich mixer, and a free-fall mixer.

4. The process of claim 1, where the heating has a duration in the range of from 20 minutes to 180 minutes.

5. The process of claim 1, wherein the heating is carried out in a rotary kiln, and the rotary kiln is an indirect heated rotary kiln.

6. The process of claim 1, wherein the rotary kiln is a rotary kiln with knockers, and
wherein the pendulum kiln is a pendulum kiln with knockers.

7. The process of claim 1, wherein the rotary kiln is a rotary kiln with internals, and
wherein the pendulum kiln is a pendulum kiln with internals.

8. The process of claim 1, wherein the material is heated in a rotary kiln, and the rotary kiln is operated with a Froude number in the range of from $10^{-5}$ to $10^{-2}$.

9. The process of claim 1, wherein the material is heated in an atmosphere with a concentration of oxygen of at least 20% by vol.

10. The process of claim 1, wherein a solvent is present during the mixing, and
wherein prior to the heating, the solvent is removed at a temperature from zero to 300° C.

11. The process of claim 1, wherein the heating is carried out under a counter current flow of solid and gas phase.

* * * * *

UNITED STATES PATENT AND TRADEMARK OFFICE
CERTIFICATE OF CORRECTION

| | | |
|---|---|---|
| PATENT NO. | : 11,462,732 B2 | Page 1 of 1 |
| APPLICATION NO. | : 16/976252 | |
| DATED | : October 4, 2022 | |
| INVENTOR(S) | : Benedikt Kalo et al. | |

It is certified that error appears in the above-identified patent and that said Letters Patent is hereby corrected as shown below:

On the Title Page

Item (30), under "Foreign Application Priority Data," "18159047" should read --18159047.2--.

In the Claims

Claim 5, Column 10, Line 23, "arotary" should read --a rotary--.

Signed and Sealed this
Seventh Day of February, 2023

*Katherine Kelly Vidal*

Katherine Kelly Vidal
*Director of the United States Patent and Trademark Office*